Nov. 27, 1962  M. G. THASSY  3,066,003

PRELOADED PISTON

Filed Nov. 8, 1961

INVENTOR
MICHAEL G. THASSY

Paul O. Pippel

ATTORNEY

__PAGE_START__
3,066,003
PRELOADED PISTON
Michael G. Thassy, Chicago, Ill., assignor to International Harvester Company, Chicago, Ill., a corporation of New Jersey
Filed Nov. 8, 1961, Ser. No. 150,933
10 Claims. (Cl. 309—14)

The present invention relates to a piston and more particularly to a piston consisting of two elements assembled in a preloaded manner for use in hydraulic cylinders.

The normal methods of fastening the piston to the rod is by using a large nut. In order to obtain the desirable high axial tension in the rod for fatigue purposes, this type of assembly necessitates the use of a high torque which creates the difficult problem of holding the piston rod. The large nut design also creates undesirable torsional stresses in the rod during assembly.

An object of this invention is to provide an improved piston consisting of a plurality of elements.

Another object is to provide a piston consisting of a plurality of fastened elements into a rigid assembly by preloading.

Another object is to preload a piston consisting of a plurality of elements in such a manner as to provide low torque and high preload.

Still another object is to provide a piston consisting of a plurality of elements assembled in such a manner as to provide low torque, high preload and longer piston rod fatigue life.

Further another object is to provide a piston assembly having a plurality of elements to include seal means so as to prevent any fluid bypass or passage.

Still another object is to provide a piston assembly having a plurality of elements with contacting faces.

Further another object to provide a piston assembly having a plurality of elements with contacting faces being preloaded in such a manner tending to urge apart the contacting faces.

Figure 1:
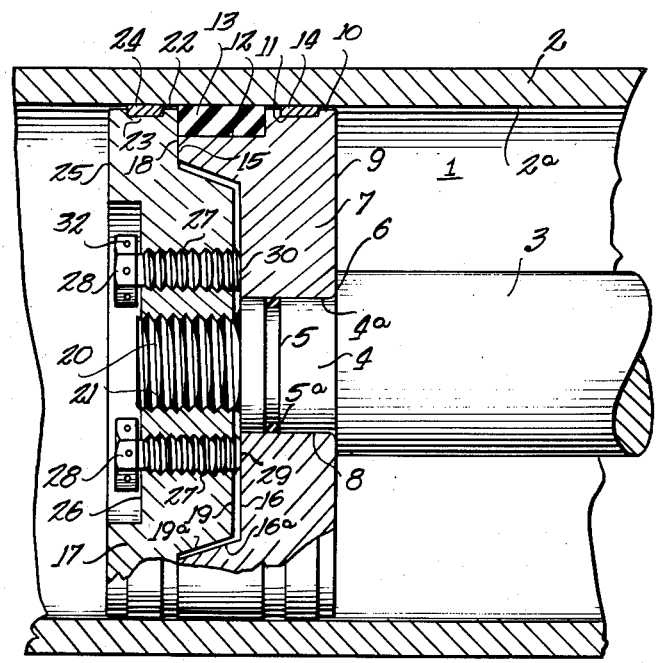
Figure 2:
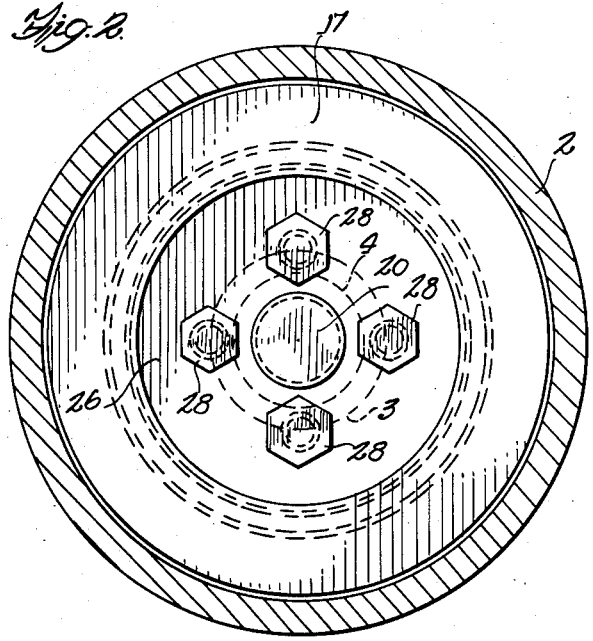

The foregoing and other objects of the invention will be apparent from the construction and arrangement illustrated in the accompanying drawings wherein:

FIGURE 1 is an elevational view partly in cross section embodying a preferred form of the invention, and FIGURE 2 is an end view of FIGURE 1.

Referring to the drawings in detail and more particularly to FIGURE 1, the invention consists of a piston assembly generally indicated by number 1. The piston assembly slides along inside wall 2a of cylinder 2 shown in cross section and comprises piston elements 7 and 17 being mounted on piston rod 3 at its extension having portions 4 and 20. Extension portion 4 consists of cylindrical surface 4a which is of less diameter than the piston rod 3 resulting in shoulder face 6 between the rod and the extension. The other portion of the extension, shown as being of smaller diameter than portion 4, consists of threaded portion 20 which fastens the outer piston element 17 to the inner piston element 7 resulting in a fastened piston assembly on the piston rod 3. The right piston element 7 has bore 8 that slidably fits over the surface 4a of extension portion 4. Outer face 9 of the right element 7 is urged against shoulder face 6 of the piston rod 3 when the piston is properly assembled.

Peripheral face 10 of the right element consists of two annular circumferential grooves 11 and 12, the smaller annular groove 11 mounts wear ring 14 constructed of any suitable material known in the art and engages the cylinder wall 2a of cylinder 2. The other groove 12 mounts annular seal 13 that aids in preventing fluid bypass between the elements contacting faces 15 and 18 that extend radially outward from the extension portions 4 and 20 to be further discussed hereafter in detail. Also the material used in the seal can be of any suitable material conventional in the art. The left piston element 17 consists of contacting face 18 engaging the other element's contacting face 15 with its outer peripheral face 22 consisting of groove 23 mounting wear ring 24 which is similar to wear ring 14 on the other piston element 7. Outer face 25 of piston element 17 has recessed portion 26 that permits a compact assembly of the cap screws 28 and at the same time sufficient preloading of the piston assembly to be discussed in detail further hereinafter. The left element 17 is fastened onto threaded extension portion 20 by having threaded bore 21. Thus it can be readily seen that with the right element 7 assembled on extension portion 4 and having its outer face 9 urged against shoulder face 6 and with the left element 17 threadedly fastened on the extension surface 20, that both elements 7 and 17 are assembled into a piston assembly.

In order to achieve a secure piston assembly during operation the instant invention provides through a series of capscrews a preloading action of a low torque nature but of a sufficient high preload to prevent the unfastening of the elements and consequent disassembly of the piston during operation. The right element 7 contacting face 15 has a portion consisting of recessed portion 16 with its conical sidewalls 16a. The left element 17 with its contacting face 18 has a projecting portion 19 with its corresponding conical sidewall 19a that projects into the recessed portion 16 of the right element 7. It is readily conceivable to those skilled in the art that the projecting portion and recessed portion on the elements as shown in FIGURE 1 could be interchanged achieving the same results. As shown in FIGURE 1 there is a substantial separating space between portions 16 and 19 as well as their corresponding sidewalls 16a and 19a. It is necessary to have at least a minute space between these portions 16 and 19, and walls 16a and 19a in order to achieve sufficient preloading and no separation of the fastened elements at their contacting faces 15 and 18. The capscrews 28 extend through threaded bores 27 of the left element 17 from recessed portion 26 and engage in an abutting manner at areas 29 and 30 on portion 16. FIGURE 2 shows an end view of the capscrews 28 being equally spaced from each other as well as from the center line of the piston rod. Although not shown in FIGURE 2, it is readily conceivable to those skilled in the art that increasing the number of equally spaced capscrews results in lower torque and more evenly distributed preload around the radial cross section of the piston assembly. Thus, it can readily be seen that when the right element 7 is mounted on extension surface 4a and the left element 17 is threaded upon its extension portion 20, the two elements 7 and 17 become fastened in a rigid manner into a piston assembly with contacting faces 15 and 18 in abutting engagement. However, in operation of the piston, the fastened assembly would become loose in a matter of time without sufficient preloading. Therefore, rotating capscrews 28 in threaded bores 27 abuttingly engage portion 16 at areas 29 and 30 to achieve preloading. Preloading occurs when the threads of the capscrews 28 in their threaded bores 27 react tending to urge apart contacting faces 15 and 18 of the fastened piston assembly. It should also be apparent to those skilled in the art that the same preloading could be achieved by mounting the capscrews 28 in threaded bores in the right element 7. The result of preloading in the above manner is a high preload and low torque on the piston assembly. If necessary, the capscrews 28 can be locked by lock wire, not shown, being passed through lock holes 32 only one being identified in FIGURE 1.

To prevent any fluid bypass or passage on either side of the preloaded piston assembly during operation, seals have been provided to prevent such bypass between the contacting faces of the elements. Since the capscrews 28 provide low torque and high preload a satisfactory metal-to-metal contact seal is usually achieved between shoulder face 6 and outer face 9 of the right element 7. If the torque is too high element 7 would rotate relative to the piston rod breaking the seal between the outer face 9 and the shoulder face 6. Normally the metal-to-metal contact of faces 6 and 9 is a sufficient seal because of the pressure caused by fastening and preloading in the manner described above of the instant invention. If the seal at shoulder face 6 is insufficient an O-ring can be provided on extension portion 4, such as O-ring 5a mounted on annular groove 5 shown in FIGURE 1 for illustration only. Peripheral annular seal 13 mounted in groove 12 between the contacting faces was discussed in detail in paragraph above. Thus the two seals, namely, 13 and the other between faces 6 and 9, cooperate to prevent fluid bypass or passage between contacting faces 15 and 18 during operation of the fastened and preloaded piston assembly.

From the foregoing, it will be seen that this invention is one well adapted to attain all of the ends and objects hereinabove set forth together with other advantages which are obvious and which are inherent to the structure In view of the various modifications of the invention which will occur to those skilled in the art upon consideration of the foregoing disclosure without departing from the spirit or scope thereof, only such limitations should be imposed as are indicated by the appended claims.

The invention having been described, what is claimed is:

1. In a piston assembly comprising, a piston rod including an extension, a piston, said piston including first and second elements, said first element including a first bore for mounting on said extension, contacting faces on said elements extending radially outward from said extension, means for fastening said second element to said extension for urging said contacting faces in engagement to provide a substantially rigid piston assembly, preloading means extending through one of said elements and abuttingly engaging said face of another of said elements, said preloading means being movable and tending to urge apart said contacting faces of said elements to provide a preloaded piston assembly.

2. The piston assembly of claim 1, said preloading means consisting of a first threaded portion, said first threaded portion being in engagement with a second threaded portion in one of said elements and extending therethrough.

3. The piston assembly of claim 1, said fastening means including a second bore in said second element, said second bore being in engagement with said extension.

4. In a preloaded piston assembly comprising: a piston rod including an extension, a piston, said piston consisting of first and second elements, said first element having a bore for mounting on said extension, contacting faces on said elements extending radially outward from said extension, one of said contacting faces including a radial recessed portion, another of said contacting faces including a projecting portion, said projecting portion projecting into said recessed portion, means for fastening said second element to said extension for urging said contacting faces in engagement to provide a substantially rigid assembly, preloading means extending through one of said elements and abuttingly engaging said face of another of said elements, said preloading means being movable and tending to urge apart said contacting faces of said elements to provide a preloaded piston assembly.

5. In a piston assembly comprising: a piston rod including an extension, a piston, said piston including first and second elements with peripheral faces and opposite outer faces, said first element including a bore for mounting on said extension, contacting faces on said elements extending radially outward from said extension, means for fastening said second element to said extension for urging contacting faces in engagement to provide a substantially rigid piston assembly, one of said outer faces including a recessed portion; preloading means extending through one of said elements with said outer recessed portion and abuttingly engaging one of said contacting faces of another of said elements, said preloading means being movable and tending to urge apart said contacting faces to provide a preloaded piston assembly.

6. In a piston assembly of claim 5, a shoulder face extending radially outward between said extension and said rod, an outer face of one of said elements urged against said shoulder face during fastening of said piston into said rigid assembly and during preloaded movement of said preloading means.

7. In a piston assembly of claim 6, a circumferential groove in one of said peripheral faces, first annular seal means mounted in said groove, said first seal means preventing passage of any fluid.

8. In a piston assembly of claim 7, said shoulder face during preloading of said piston assembly being in urged engagement with said outer face of one of said elements to provide second seal means between said faces, said first and second seal means cooperating to prevent fluid bypass through said contacting faces of said piston assembly.

9. In a piston assembly comprising, a piston rod including an extension, a piston, said piston including first and second elements, said first element including a bore for mounting on said extension, contacting faces on said elements extending radially outward from said extension, fastening means connecting said second element to said first element to urge said faces into engagement, and movable preloading means connected to one of said elements tending to urge apart said contacting faces.

10. In a piston assembly comprising, a piston rod including an extension, a piston, said piston including first and second elements, said first element including a bore for mounting on said extension, contacting faces on said elements extending radially outward from said extension, fastening means connecting said second element to said extension to urge said faces into engagement, and movable preloading means connected to one of said elements tending to urge apart said contacting faces.

References Cited in the file of this patent

UNITED STATES PATENTS

| | | |
|---|---|---|
| 1,721,325 | Wilson | July 16, 1929 |
| 2,321,160 | Schnitzer | June 8, 1943 |